(12) United States Patent
Zhao et al.

(10) Patent No.: US 12,410,870 B2
(45) Date of Patent: Sep. 9, 2025

(54) DETECTION AIR FAUCET

(71) Applicant: TangTring Seating Technology Inc., Huizhou Guangdong (CN)

(72) Inventors: Peng Zhao, Taipei (TW); Chia-Yu Yu, Taipei (TW); Sheng-Chi Kao, Taipei (TW); Zheng-Xin Han, Huizhou Guangdong (CN)

(73) Assignee: TangTring Seating Technology Inc., Huizhou (CN)

( * ) Notice: Subject to any disclaimer, the term of this patent is extended or adjusted under 35 U.S.C. 154(b) by 140 days.

(21) Appl. No.: 18/479,262

(22) Filed: Oct. 2, 2023

(65) Prior Publication Data

US 2025/0110003 A1 Apr. 3, 2025

(51) Int. Cl.
*F16K 17/04* (2006.01)
*G05D 16/10* (2006.01)
*F16K 15/02* (2006.01)
*F16K 15/06* (2006.01)

(52) U.S. Cl.
CPC ........ *F16K 17/0473* (2013.01); *F16K 17/048* (2013.01); *G05D 16/101* (2019.01); *F16K 15/025* (2013.01); *F16K 15/06* (2013.01); *Y10T 137/2544* (2015.04)

(58) Field of Classification Search
CPC .... F16K 17/0473; F16K 17/048; F16K 17/18; F16K 17/196; Y10T 137/2544; G05D 16/101
See application file for complete search history.

(56) References Cited

U.S. PATENT DOCUMENTS

| | | | | |
|---|---|---|---|---|
| 3,435,839 A * | 4/1969 | Elder | .................. | A61M 16/208 128/205.24 |
| 3,507,542 A * | 4/1970 | Cannella | ................. | B60T 13/58 303/3 |
| 3,905,382 A * | 9/1975 | Waterston | ............... | E03C 1/108 137/218 |
| 4,121,580 A * | 10/1978 | Fabish | .................. | A61M 16/12 128/205.13 |
| 4,239,038 A * | 12/1980 | Holmes | ............... | A61M 16/209 128/205.24 |
| 4,733,919 A * | 3/1988 | Jacobs | .................... | B60T 15/54 280/421 |
| 7,637,279 B2 * | 12/2009 | Amley | .................. | F16K 15/147 137/512 |

* cited by examiner

*Primary Examiner* — Kevin F Murphy
(74) *Attorney, Agent, or Firm* — Nicholas Makridakis

(57) ABSTRACT

The invention provides a detection air faucet, including a working chamber and a source port in communication with the working chamber. The working chamber is provided with a pressure sensing member for sensing a change in the pressure in the chamber, and the pressure in the working chamber is affected by an object connected to the source port. The pressure sensing member is provided with a working pressure range. Furthermore, the detection air faucet includes a working pressure maintaining mechanism implemented by a pressure release structure and a pressure maintaining structure. When the pressure in the working chamber exceeding the working pressure range, the working chamber discharges air by the pressure release structure, and when the pressure in the working chamber is lower than a pressure outside the detection air faucet, the air outside the detection air faucet entering into the working chamber by the pressure maintaining structure.

15 Claims, 9 Drawing Sheets

DETECTION AIR FAUCET

FIELD OF THE INVENTION

The invention relates to a detection air faucet, and more particularly, to a detection air faucet having a pressure release structure and a pressure maintaining structure.

BACKGROUND OF THE INVENTION

In the field of pressure sensing, a pressure sensing member is mostly used for measurement, and the pressure sensing member is generally designed to have a working pressure range. When the pressure sensing member is connected to a physiological detection member, an air pressure system is formed by the pressure sensing member and the physiological detection member needs to be maintained within the working pressure range. Once the working pressure range is exceeded, a detection accuracy will be affected. In addition, the aforementioned air pressure system is affected by temperature and air dissipation so that a completely sealed effect in the air pressure system is hard to achieve. Meanwhile, temperature differences will also change volumes of the air so that the air pressure in the air pressure system is difficult to maintain, thereby affecting the detection of the pressure sensing member.

Referring to FIG. 9, in order to solve the aforementioned problems in the current pressure sensing field, an air faucet 51 is generally arranged in an air pressure system 50. The air faucet 51 is used to connect a pressure sensing member 52 and a physiological detection member 53 in the air pressure system 50, wherein the physiological detection member 53 is formed by bonding at least two thin sheets 531, and a main detection object of the physiological detection member 53 is the air, a space is provided between the two thin sheets 531 for retaining the air when the physiological detection member 53 is pressured, the space is changed to change an internal air pressure, and wherein a change in a pressure in the physiological detection member 53 is sensed via the air faucet 51, a physiological signal is generated and transmitted to an associated computing device via a circuit board 54 by the pressure sensing member 52. In addition, when the physiological detection member 53 is pressured, the pressure in the air pressure system 50 exceeds the working pressure range, the air with an excessive pressure in the air pressure system 50 can be released through the air faucet 51 so that the air pressure system 50 can be maintained within the working pressure range of the pressure sensing member 52. However, the air faucet 51 cannot cope with a negative pressure condition in the air pressure system 50, thus the physiological detection member 53 stops being pressured, once an internal pressure is lower than an external atmospheric pressure by restoring the volume of the air, the pressure in the physiological detection member 53 cannot be restored, thus affecting the detection results of the pressure sensing member 52.

SUMMARY OF THE INVENTION

It is the main object of the present invention to resolve the problems that the conventional detection air faucet is unable to cope with the state of negative pressure.

In order to achieve the above object, the present invention provides a detection air faucet, including a working chamber and a source port in communication with the working chamber, the working chamber is provided with a pressure sensing member for sensing a change of a pressure therein, the pressure in the working chamber is affected by an object connected to the source port, and the pressure sensing member is provided with a working pressure range. Furthermore, the detection air faucet includes a working pressure maintaining mechanism implemented by a pressure release structure and a pressure maintaining structure arranged on the detection air faucet, when the pressure in the working chamber exceeding the working pressure range, the working chamber discharges air by the pressure release structure, and when the pressure in the working chamber is lower than a pressure outside the detection air faucet, the air outside the detection air faucet entering into the working chamber by the pressure maintaining structure.

In an embodiment, the pressure release structure is located on an axis as same as the pressure maintaining structure, an extension line of the source port and the axis are staggered between the pressure release structure and the pressure maintaining structure.

In an embodiment, the detection air faucet includes a body and an air inlet defined by the body, the pressure maintaining structure is a one-way valve arranged on the air inlet.

In an embodiment, the one-way valve includes an installation pin arranged on the air inlet and a flap connected to the installation pin to selectively close the air inlet.

In an embodiment, the body includes a first annular wall connected to the air inlet, the pressure maintaining structure further including a porous material member arranged in a space defined by the first annular wall.

In an embodiment, the pressure maintaining structure is activated when the pressure in the working chamber is lower than an atmospheric pressure.

In an embodiment, the detection air faucet includes a body and an air release port defined by the body, the pressure release structure includes a valve plate arranged on the air release port, an elastic member connected to the valve plate determines the air release speed, and a baffle arranged on the body is provided with the elastic member for arrangement.

In an embodiment, the pressure release structure includes a connecting member disposed between the elastic member and the valve plate.

In an embodiment, the valve plate includes a first surface facing the air release port and a second surface facing the connecting member, the first surface including a sealing annular portion provided for abutting against an edge of the air release port.

In an embodiment, the body includes a second annular wall connected to the air release port, at least two installation holes assembled with the baffle are formed on the second annular wall, the baffle includes at least two lugs assembled with the at least two installation holes.

In an embodiment, the detection air faucet has an air release gap defined by the body and the baffle.

In an embodiment, a free length of the elastic member is greater than a length of a distance between the baffle and the connecting member, each of the at least two installation holes includes a change of width thereof, the at least two lugs are respectively positioned at a widest portion of each of the at least two installation holes, the air release gap is formed on a portion of each of the at least two installation holes that is not provided with the at least two lugs.

In an embodiment, the connecting member includes a cap-shaped structure provided for the elastic member to be disposed therein.

In an embodiment, a width of the cap-shaped structure is smaller than an inner diameter length of the second annular wall.

In an embodiment, the detection air faucet includes an assembly port for providing for the arrangement of the pressure sensing member and at least one sealing annular arranged in the assembly port.

Compared with the conventional structure, there are following characteristics through the aforementioned implementation of the present invention. The detection air mouth of the present invention is arranged with the working pressure maintaining mechanism, which is implemented through the pressure release structure and the pressure maintaining structure, so that the pressure in the working chamber is maintained within the working pressure range of the pressure sensing member.

DETAILED DESCRIPTION OF THE PREFERRED EMBODIMENTS

The detailed description and technical content of the invention now are described below with reference to the drawings.

Figure 8:
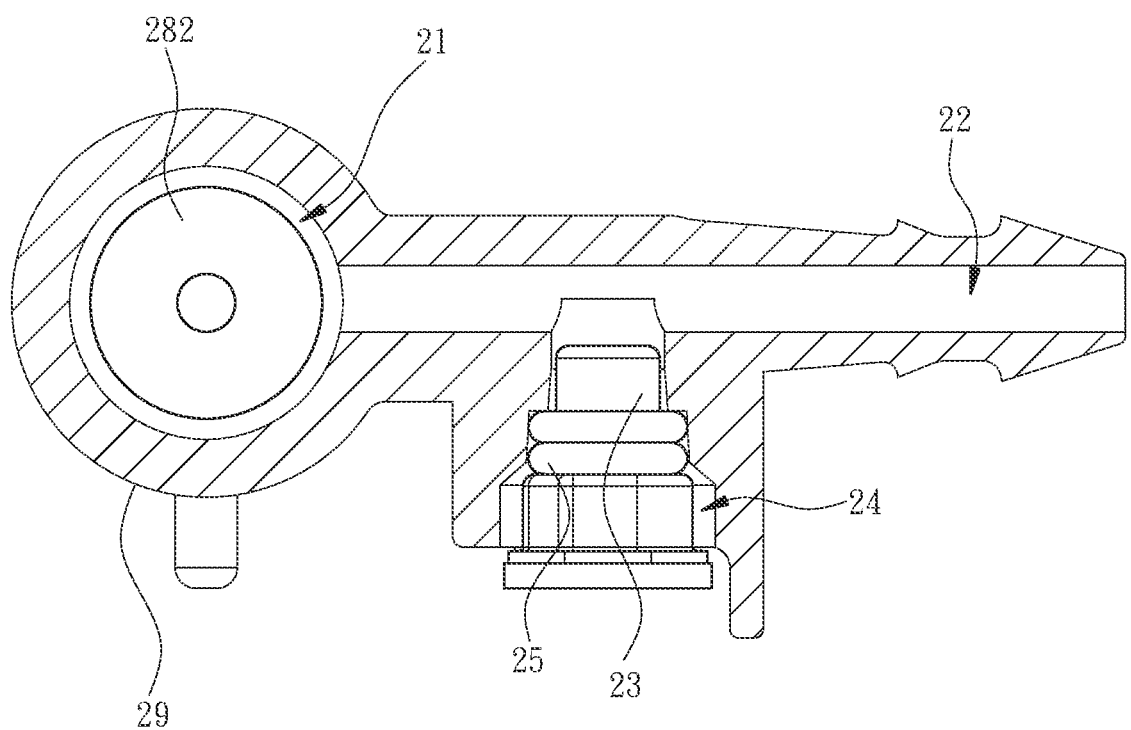
FIG. 8 is a schematic front view of an embodiment according to the present invention.
Figure 9:
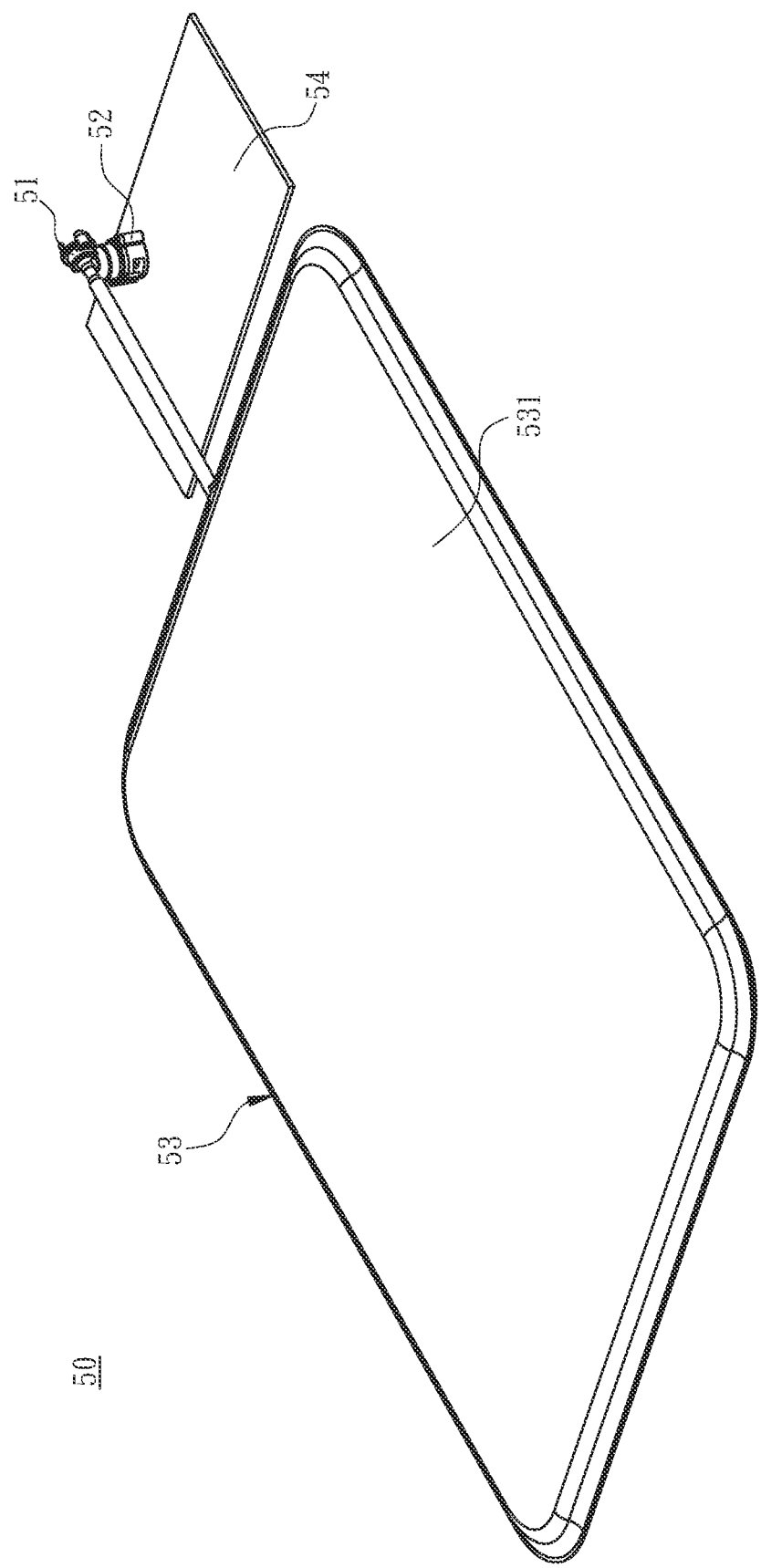
FIG. 9 is a schematic view of a conventional structure.

Referring to FIG. 1, FIG. 2, FIG. 3, FIG. 4 and FIG. 5, the present invention provides a detection air faucet 20, including a working chamber 21 and a source port 22 in communication with the working chamber 21, and the working chamber 21 is in communication with a pressure sensing member 23 for sensing a change of a pressure therein. The pressure sensing member 23 is not limited to an assembling position relative to the detection air faucet 20; the pressure sensing member 23 is limited to where the pressure can be sensed in the working chamber 21. For the embodiment of the present invention, referring to FIG. 8, the detection air faucet 20 is provided with an assembly port 24 for the pressure sensing member 23 to be disposed therein. In order to maintain an internal pressure of the detection air faucet 20, the detection air faucet 20 further comprises at least one sealing ring 25 arranged in the assembly port 24.

Subsequently, the pressure in the working chamber 21 is affected by an object connected to the source port 22; that is, the source port 22 serves as a pressure source of the working chamber 21. The source port 22 is connected to a detection member (not shown), and the pressure is changed in the working chamber 21 while air inlets from the source port 22, so that the pressure sensing member 23 sensed the change of the pressure in the working chamber 21. In addition, the pressure sensing member 23 is designed with a working pressure range defined by an upper limit value and a lower limit value sensed by the pressure sensing member 23. The upper limit value and the lower limit value may be acquired by self-defining in experiments based on the pressure sensing member 23, or may be acquired by a software cooperating with the pressure sensing member 23.

Further, the detection air faucet 20 comprises a working pressure maintaining mechanism, an object of the working pressure maintaining mechanism is to maintain the pressure in the working chamber 21 and to be implemented by a pressure release structure 26 and a pressure maintaining structure 28 arranged on the detection air faucet 20. The pressure release structure 26 and the pressure maintaining structure 28 work based on the pressure in the working chamber 21. When the pressure in the working chamber 21 exceeds the working pressure range, the working chamber 21 discharges the air by the pressure release structure 26; when the pressure in the working chamber 21 is lower than a pressure outside the detection air faucet 20, the air outside the detection air faucet 20 enters into the working chamber 21 by the pressure maintaining structure 28. It can be understood that the air inlets into the working chamber 21 described herein refers to the air entering into the working chamber 21 naturally without any action of an external force.

Figure 1:
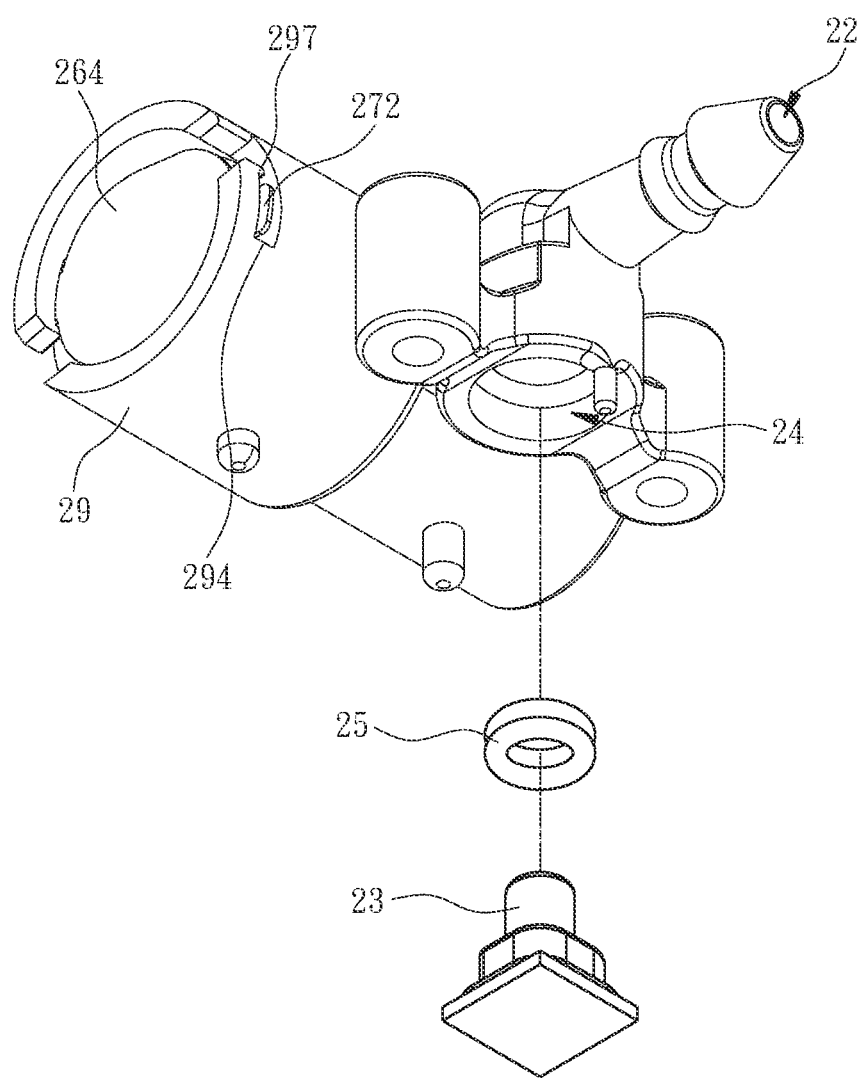
FIG. 1 is a schematic three dimensional structure view of an embodiment according to the present invention.
Figure 2:
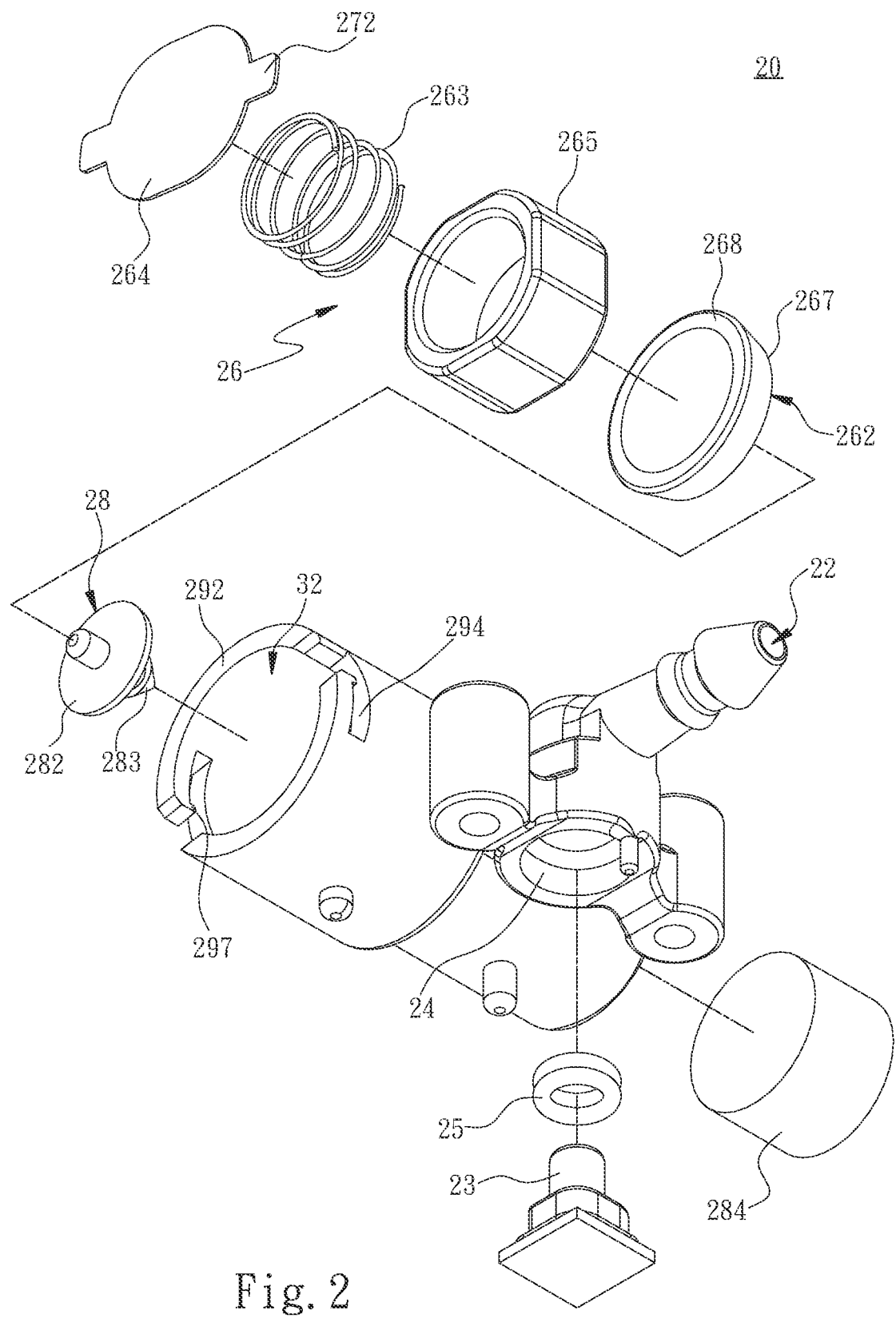
FIG. 2 is a first schematic structure exploded view of an embodiment according to the present invention.
Figure 3:
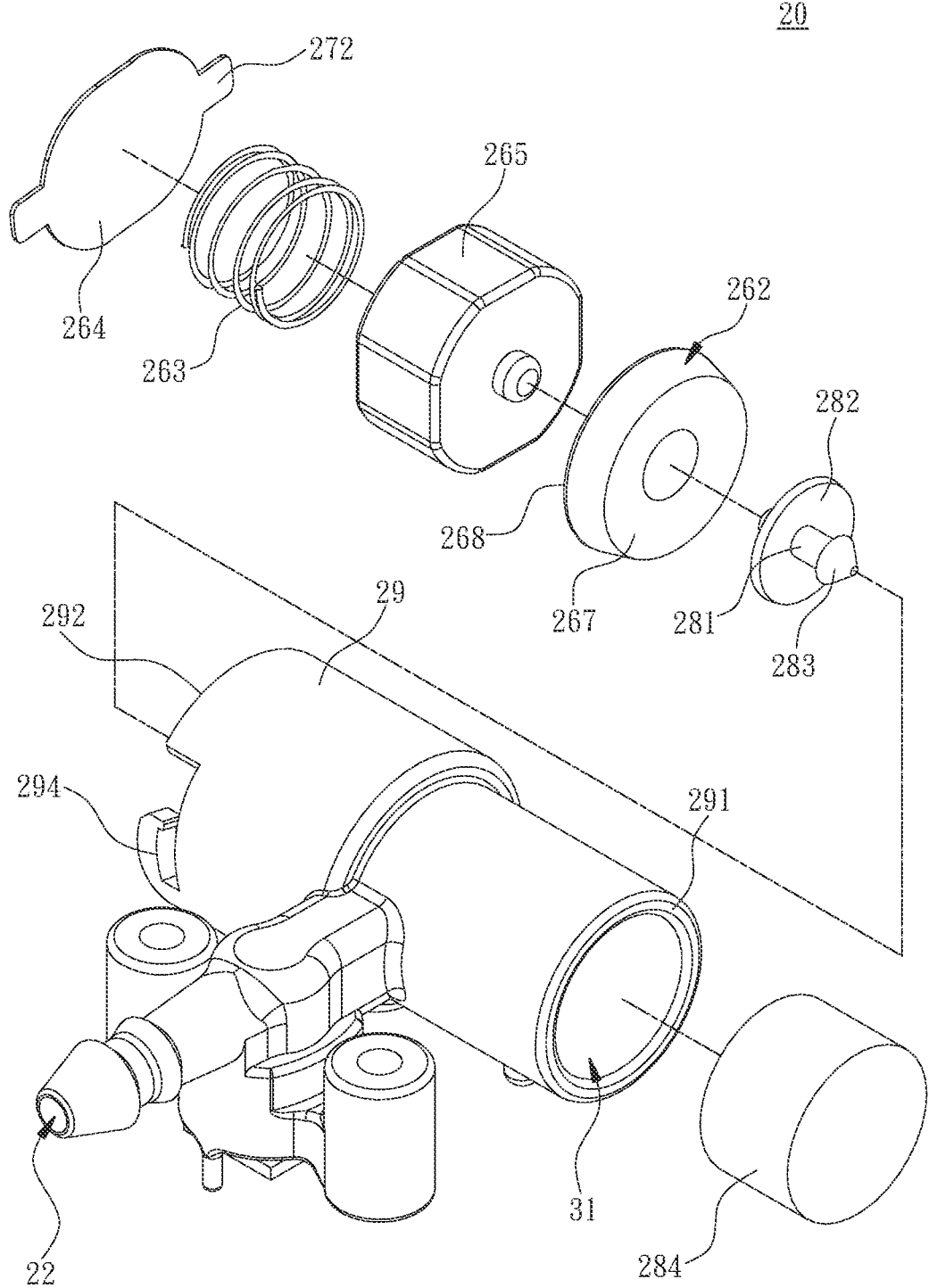
FIG. 3 is a second schematic structure exploded view of an embodiment according to the present invention.
Figure 4:
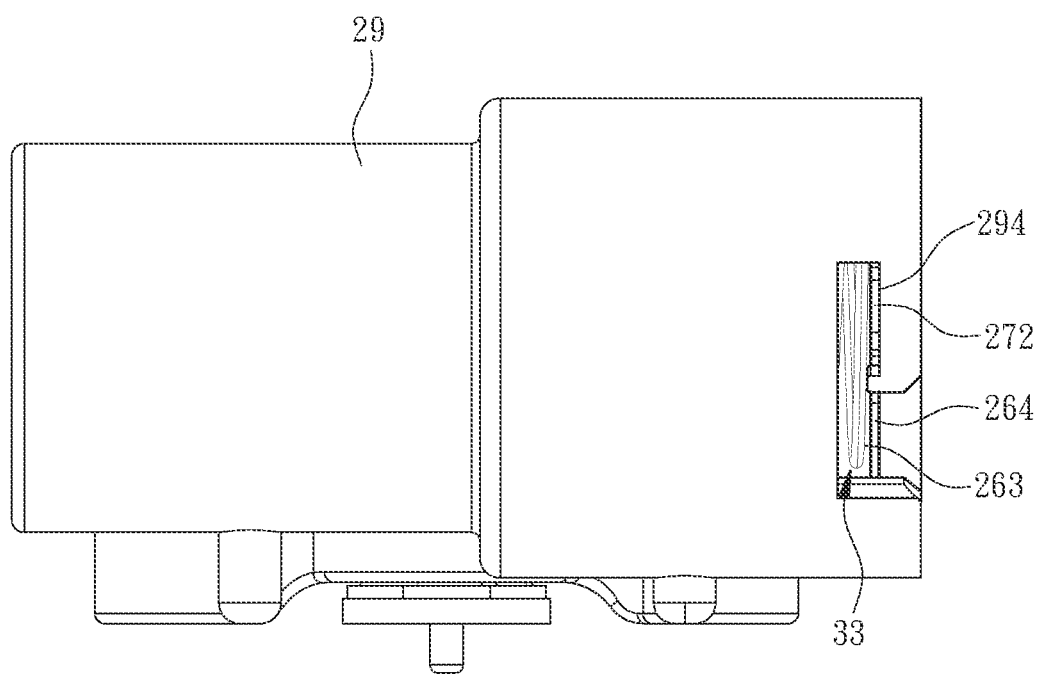
FIG. 4 is a schematic side view of an embodiment according to the present invention.
Figure 5:
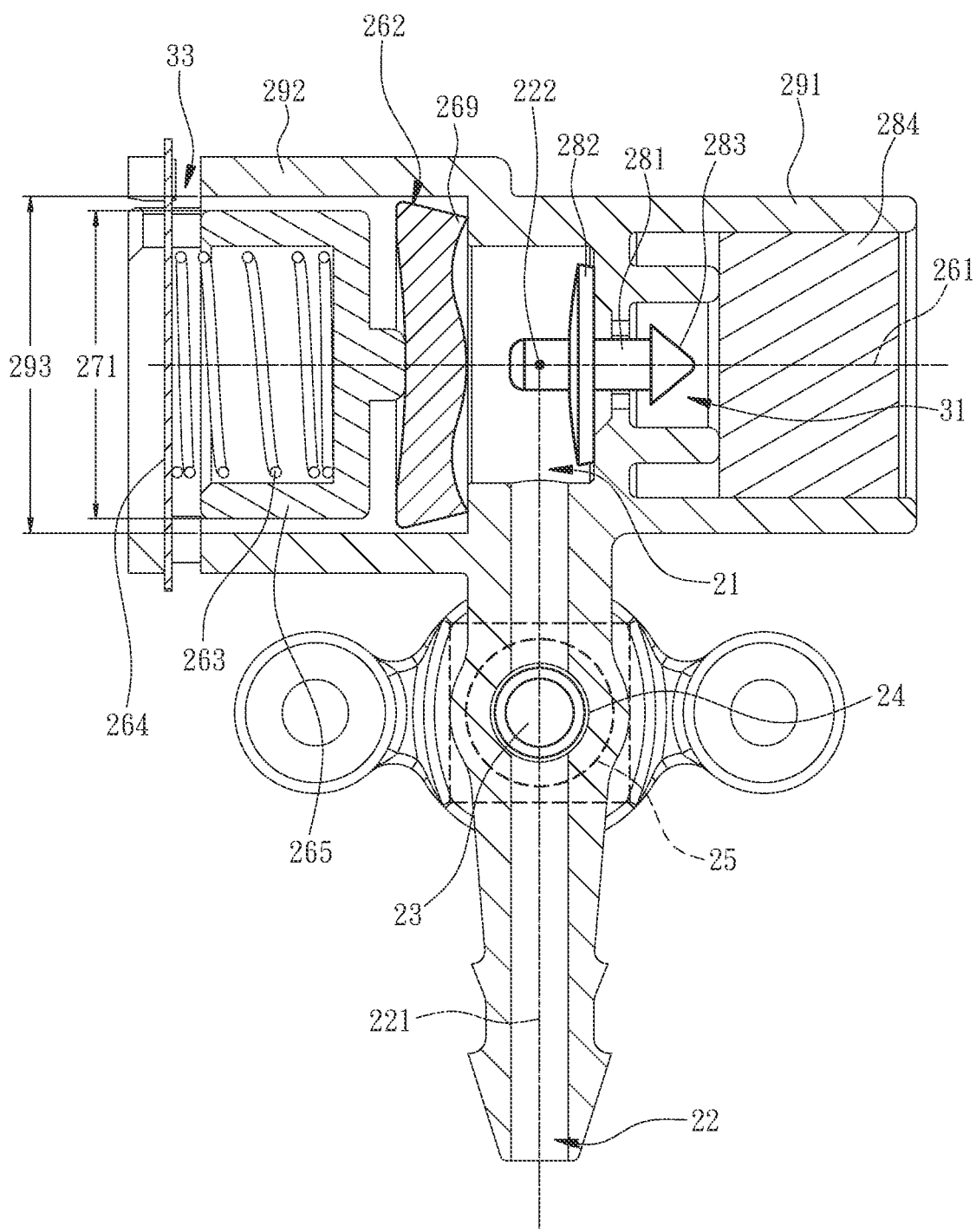
FIG. 5 is a schematic structure sectional view of an embodiment according to the present invention.
Figure 6:
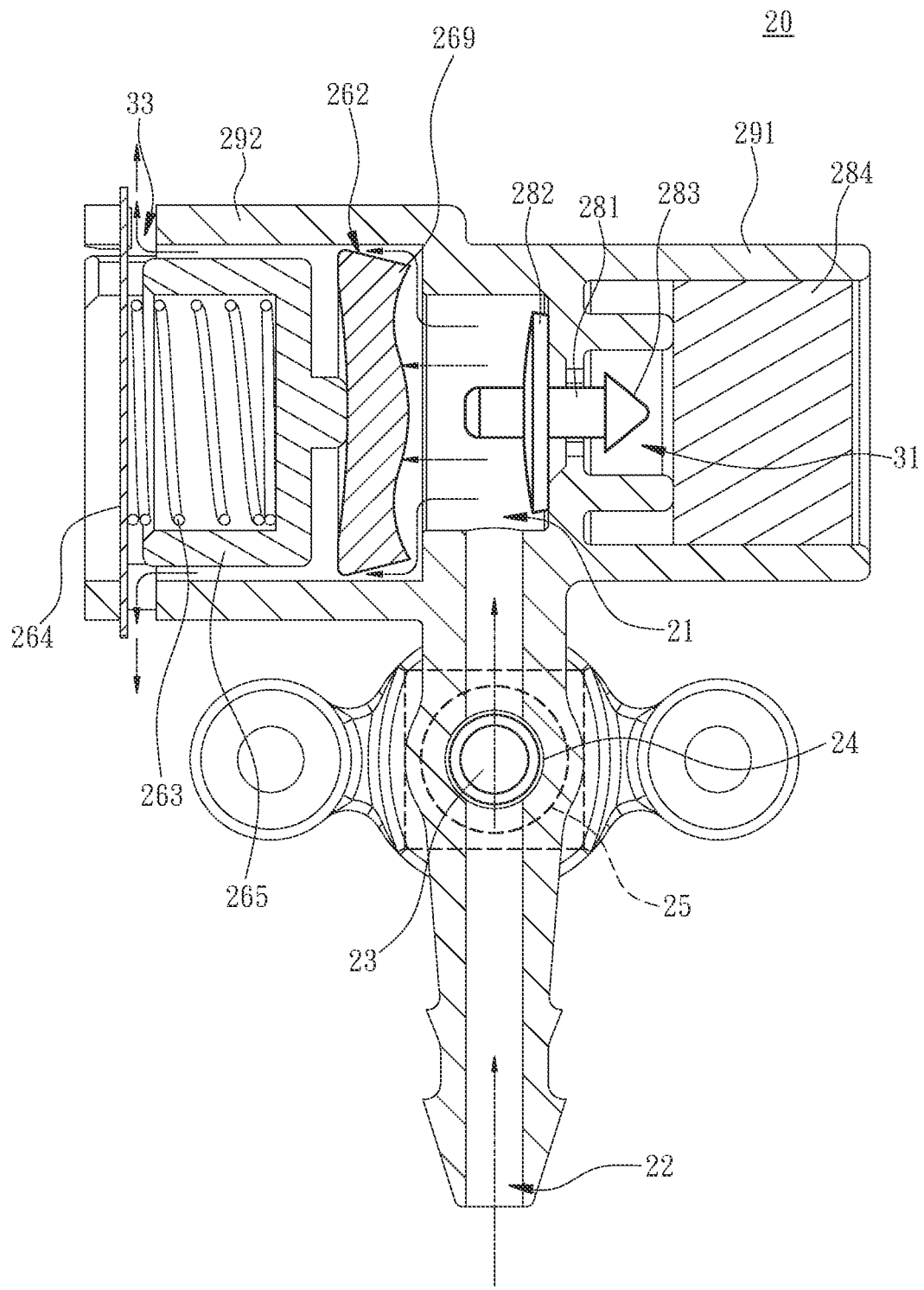
FIG. 6 is a first schematic implementation view of an embodiment according to the present invention.
Figure 7:
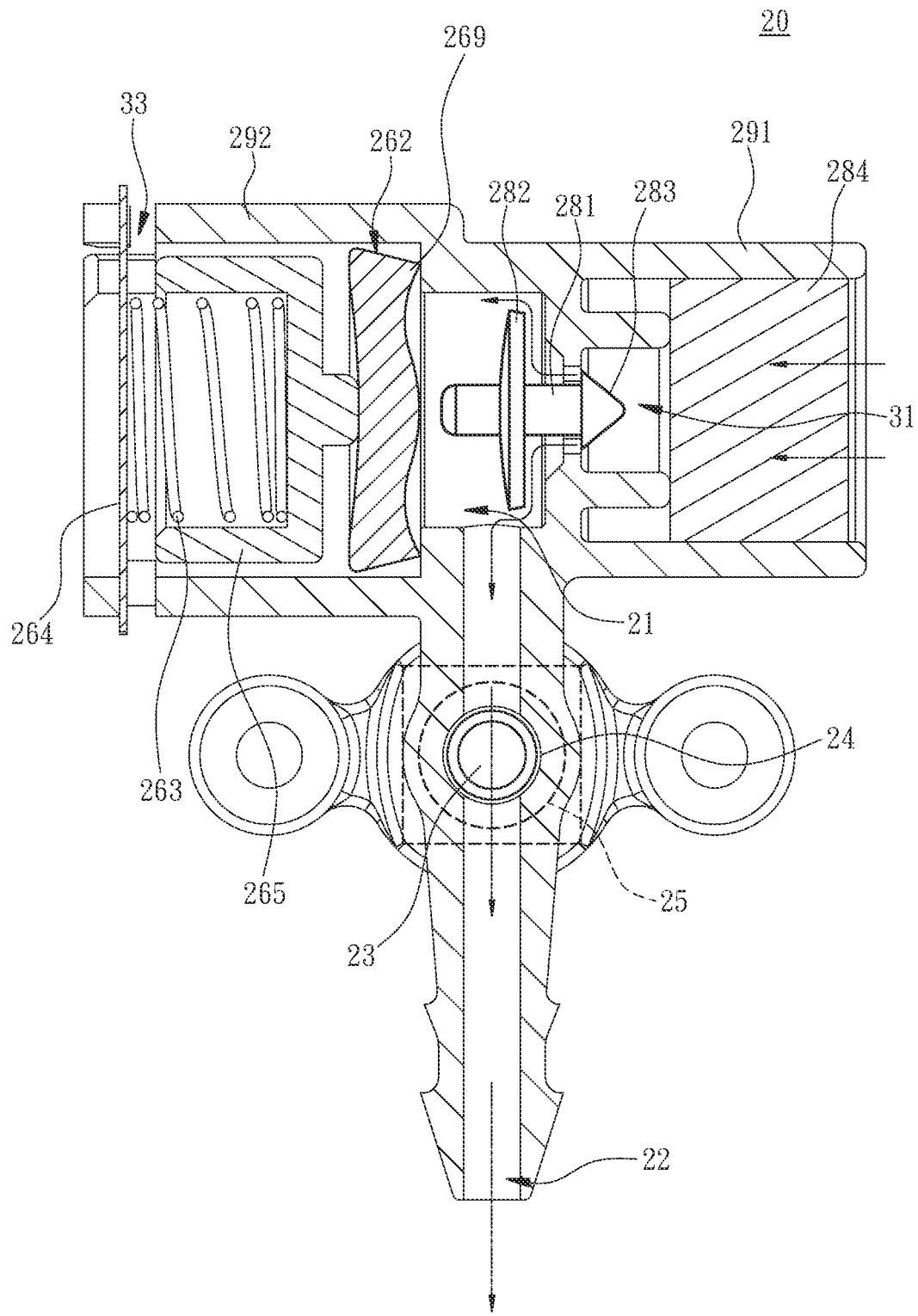
FIG. 7 is a second schematic implementation view of an embodiment according to the present invention.

Referring to FIG. 5, FIG. 6 and FIG. 7, an explanation of the implementation of the detection air faucet 20 as follows. Assuming that the pressure in the working chamber 21 is in line with the working pressure range and the pressure outside the detection air faucet 20 at beginning, the pressure release structure 26 and the pressure maintaining structure 28 are not activated so that the air does not enter into nor be discharged from the working chamber 21. Once the object connected to the source port 22 is pressured and the volume of the object is compressed, the pressure increased in the source port 22 also affects the working chamber 21; when the pressure in the working chamber 21 exceeds the working pressure range, the pressure release structure 26 is activated, and the working chamber 21 discharges the air until the pressure in the working chamber 21 fells to be in line with the working pressure range. Conversely, when the object connected to the source port 22 is not pressured and the volume of the object is restored, the pressure decreases in the source port 22 also affects the working chamber 21; when the pressure in the working chamber 21 is lower than the pressure outside the detection air faucet 20, the pressure maintaining structure 28 is activated, and the air inlets into the working chamber 21 until the pressure in the working chamber 21 rises to be in line with the working pressure range.

It can be understood from the foregoing-mentioned that the detection air faucet 20 of the present invention integrates the pressure release structure 26 and the pressure maintaining structure 28 so that the detection air faucet 20 can respond to conditions of the pressure of the object connected to the source port 22 which is too high or too low, and the pressure in the working chamber 21 can be maintained within the working pressure range of the pressure sensing member 23, and solving situations derived from conventional detection air faucets that cannot respond to the pressure getting too low.

Subsequently, referring to FIG. 1, FIG. 2, FIG. 3, FIG. 4 and FIG. 5, the pressure release structure 26 is located on an axis 261 as same as the pressure maintaining structure 28, and an extension line 221 of the source port 22 and the axis 261 are staggered to form an intersection point 222 located between the pressure release structure 26 and the pressure maintaining structure 28.

In addition, the detection air faucet 20 comprises a body 29 and an air inlet 31 defined by the body 29, and the air inlet 31 provides the working chamber 21 for an air intake function. The pressure maintaining structure 28 is a one-way valve arranged on the air inlet 31. When the pressure in the working chamber 21 is lower than an atmospheric pressure, the one-way valve is activated to release the air inlet 31 to allow the air entering the working chamber 21. More specifically, the one-way valve comprises an installation pin 281 arranged on the air inlet 31 and a flap 282 connected to the installation pin 281. The flap 282 is arranged at a position facing the air inlet 31, and only the air from outside of the detection air faucet 20 can be entered into the air inlet 31 by limitation of the flap 282. The flap 282 selectively releases the air inlet 31 by the installation pin 281 for the air entering. In another embodiment, a hook 283 is provided at one end of the installation pin 281 that does not connect to the flap 282. The hook 283 is limited by the body 29 to prevent the one-way valve from being disengaged.

Furthermore, referring to FIG. 5, FIG. 6 and FIG. 7, in an embodiment, the body 29 comprises a first annular wall 291 connected to the air inlet 31; the pressure maintaining structure 28 comprises a porous material member 284 disposed in a space defined by the first annular wall 291 and located at an end of the air inlet 31, and the air from outside of the detection air faucet 20 enters the porous material member 284 before entering the air inlet 31, thereby the porous material member 284 has functions such as air filtering and silence before the air enters the air inlet 31.

On the other hand, referring to FIG. 1, FIG. 2, FIG. 3, FIG. 4 and FIG. 5, the detection air faucet 20 further comprises an air release port 32 defined by the body 29, and an air release function is provided for the working chamber 21 by the air release port 32. The pressure release structure 26 is connected to the body 29. The pressure release structure 26 comprises a valve plate 262 arranged on the air release port 32, and an elastic member 263 connected to the valve plate 262, and a baffle 264 arranged on the body 29. The baffle 264 is provided with the elastic member 263 for arrangement so that two ends of the elastic member 263 are respectively connected to the valve plate 262 and the baffle 264, and the valve plate 262 can selectively close the air release port 32 based on an action of the elastic member 263. Specifically, when the pressure in the working chamber 21 is less than a pressure acted on the valve plate 262 by the elastic member 263, the valve plate 262 closes the air release port 32 by the elastic member 263; when the pressure in the working chamber 21 is greater than the pressure acted on the valve plate 262 by the elastic member 263, the valve plate 262 releases the air release port 32 by the elastic member 263. It can be understood that an air releasing speed of the pressure release structure 26 is determined by the elastic member 263, and the pressure release speed of the pressure release structure 26 is proportional to the pressure in the working chamber 21.

Subsequently, the pressure release structure 26 further comprises a connecting member 265 disposed between the elastic member 263 and the valve plate 262. The connecting member 265 is a cap-shaped structure provided for the elastic member 263 to be disposed therein. A side of the connecting member 265 facing the valve plate 262 may be a flat surface or a convex surface to be at least sufficient to close the air release port 32. Taking the convex surface as an example, the convex surface has a pressure maintaining function to provide the pressure release structure 26 a reinforcement when the pressure release structure 26 is at a low pressure (e.g., 5 kpa or less) so that the valve plate 262 is displaced or deformed to release the air release port 32. The valve plate 262 comprises a first surface 267 facing the air release port 32 and a second surface 268 facing the connecting member 265. The first surface 267 comprises a sealing annular portion 269 located at a periphery of the valve plate 262 to be provided for abutting against an edge of the air release port 32 to seal the air release port 32, and the second surface 268 is located relative to a side of the connecting member 265 facing the valve plate 262.

Also, referring to FIG. 5, FIG. 6 and FIG. 7, the body 29 comprises a second annular wall 292 connected to the air release port 32, an inner diameter length 293 of the second annular wall 292 is larger than a width 271 of the cap-shaped structure. When the pressure release structure 26 releases the air, the air from the air release port 32 is discharged between the second annular wall 292 and the cap-shaped structure. Furthermore, at least two installation holes 294 are formed on the second annular wall 292, and the baffle 264 is provided with at least two lugs 272 assembled with the at least two installation holes 294.

Subsequently, the detection air faucet 20 comprises an air release gap 33 defined by the body 29 and the baffle 264, the air release gap 33 communicates with the air release port 32 and discharges the air from the air release port 32 to outside. In addition, a free length of the elastic member 263 is greater than a length of a distance between the baffle 264 and the connecting member 265. The elastic member 263 temporarily storing the elastic acting force upon being compressed by the baffle 264 and the connecting member 265, after an assembly of the elastic member 263 is completed. Each of the at least two installation holes 294 has a change of width thereof, and the at least two lugs 272 are respectively positioned at a widest portion of each of the at least two installation holes 294 due to the action of the elastic member 263, the air release gap 33 is formed on a portion of each of the at least two installation holes 294 that is not provided with the at least two lugs 272. Also, each of the at least two installation holes 294 comprises a positioning block 297 located at a narrowest portion of each of the at least two installation holes 294 to limit disengagement of the at least two lugs 272. In addition, one end of each of the at least two installation holes 294 is open, so that the at least two lugs 272 can be disposed of into the at least two installation holes 294.

What is claimed is:

1. A detection air faucet, comprising a working chamber and a source port in communication with the working chamber, the working chamber provided with a pressure sensing member for sensing a change in a pressure therein, the pressure in the working chamber affected by an object connected to the source port, and the pressure sensing member is provided with a working pressure range, the detection air faucet is characterized in that:

the detection air faucet comprises a working pressure maintaining mechanism implemented by a pressure release structure and a pressure maintaining structure arranged on the detection air faucet, when the pressure in the working chamber exceeds the working pressure range, the working chamber discharges air by the pressure release structure, and when the pressure in the working chamber is lower than a pressure outside the detection air faucet, the air outside the detection air faucet enters into the working chamber by the pressure maintaining structure.

2. The detection air faucet of claim 1, wherein the pressure release structure is located on a common axis with the pressure maintaining structure, and an extension line of the source port and the axis are intersect between the pressure release structure and the pressure maintaining structure.

3. The detection air faucet of claim 1, wherein the detection air faucet comprises a body and an air inlet defined by the body, the pressure maintaining structure is a one-way valve arranged on the air inlet.

4. The detection air faucet of claim 3, wherein the one-way valve comprises an installation pin arranged on the air inlet and a flap connected to the installation pin to selectively close the air inlet.

5. The detection air faucet of claim 4, wherein the body comprises a first annular wall connected to the air inlet, the pressure maintaining structure further comprises a porous material member arranged in a space defined by the first annular wall.

6. The detection air faucet of claim 1, wherein the pressure maintaining structure is activated when the pressure in the working chamber is lower than an atmospheric pressure.

7. The detection air faucet of claim 6, wherein the detection air faucet comprises a body and an air release port defined by the body, the pressure release structure comprises a valve plate arranged on the air release port, an elastic member connected to the valve plate determines an air release speed, and a baffle arranged on the body is provided with the elastic member.

8. The detection air faucet of claim 7, wherein the pressure release structure comprises a connecting member disposed between the elastic member and the valve plate.

9. The detection air faucet of claim 8, wherein the valve plate comprises a first surface facing the air release port and a second surface facing the connecting member, the first surface comprises a sealing annular portion provided for abutting against an edge of the air release port.

10. The detection air faucet of claim 8, wherein the body comprises a second annular wall connected to the air release port, and at least two installation holes assembled with the baffle are formed on the second annular wall, and the baffle comprises at least two lugs assembled with the at least two installation holes.

11. The detection air faucet of claim 10, wherein the detection air faucet comprises an air release gap defined by the body and the baffle.

12. The detection air faucet of claim 11, wherein a free length of the elastic member is greater than a length of a distance between the baffle and the connecting member, each of the at least two installation holes comprises a change of width thereof, the at least two lugs are respectively positioned at a widest portion of each of the at least two installation holes, the air release gap is formed on a portion of each of the at least two installation holes that is not provided with the at least two lugs.

13. The detection air faucet of claim 10, wherein the connecting member is a cap-shaped structure provided for the elastic member to be disposed therein.

14. The detection air faucet of claim 13, wherein a width of the cap-shaped structure is smaller than an inner diameter length of the second annular wall.

15. The detection air faucet of claim 1, wherein the detection air faucet comprises an assembly port for the pressure sensing member and at least one sealing ring to be disposed therein.

* * * * *